US012603522B2

(12) United States Patent
Nalim et al.

(10) Patent No.: US 12,603,522 B2
(45) Date of Patent: Apr. 14, 2026

(54) CARAVANNING AUTONOMOUS VEHICLE TRAIN

(71) Applicant: THE TRUSTEES OF INDIANA UNIVERSITY, Bloomington, IN (US)

(72) Inventors: M. Razi Nalim, Indianapolis, IN (US); Euzeli C. Dos Santos, Jr., Indianapolis, IN (US); Clayton L. Nicholas, Indianapolis, IN (US); Omar Nezamuddin, Indianapolis, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 832 days.

(21) Appl. No.: 17/789,968

(22) PCT Filed: Jan. 6, 2021

(86) PCT No.: PCT/US2021/012346
§ 371 (c)(1),
(2) Date: Jun. 29, 2022

(87) PCT Pub. No.: WO2021/142016
PCT Pub. Date: Jul. 15, 2021

(65) Prior Publication Data
US 2023/0034762 A1 Feb. 2, 2023

Related U.S. Application Data

(60) Provisional application No. 62/957,463, filed on Jan. 6, 2020.

(51) Int. Cl.
*H02J 50/80* (2016.01)
*G05D 1/00* (2006.01)
(Continued)

(52) U.S. Cl.
CPC ............ *H02J 50/10* (2016.02); *G05D 1/0293* (2013.01); *G08G 1/22* (2013.01); *H02J 50/80* (2016.02); *H02J 50/90* (2016.02); *H04W 4/46* (2018.02)

(58) Field of Classification Search
CPC ...................................................... H02J 50/80
(Continued)

(56) References Cited

U.S. PATENT DOCUMENTS 6,565,147 B1 * 5/2003 Beals, Jr. ................ B60R 19/42
293/126
2010/0256852 A1 10/2010 Mudalige
(Continued)

FOREIGN PATENT DOCUMENTS

EP 3572840 11/2019
JP 2018069405 A * 5/2018

OTHER PUBLICATIONS

Search Report & Written Opinion issued in Int'l Appl. No. PCT/US2021/012346 (2021).

*Primary Examiner* — Ahmed H Omar
(74) *Attorney, Agent, or Firm* — Barnes & Thornburg LLP

(57) ABSTRACT

Embodiments presented herein disclose techniques for providing an autonomous vehicle caravanning system (AVCS) allowing for continuous wireless charging between vehicles thereof. The AVCS includes a pilot generator vehicle and one or more freight vehicles interconnected between one another without a mechanical connect. Further, the AVCS may also include one or more generator vehicles interspersed in various positions of the AVCS to provide wireless charging to vehicles therein. Passenger vehicles may be added to the caravan to receive wireless charging from the generator vehicles of the AVCS.

18 Claims, 8 Drawing Sheets

(51) Int. Cl.
_G08G 1/00_         (2006.01)
_H02J 50/10_        (2016.01)
_H02J 50/90_        (2016.01)
_H04W 4/46_        (2018.01)

(58) Field of Classification Search
USPC ........................................................ 320/108
See application file for complete search history.

(56)               References Cited

U.S. PATENT DOCUMENTS

2017/0355271 A1* 12/2017 Cronie .................... B60L 53/12
2018/0348792 A1* 12/2018 O'Brien ................. B60D 99/00
2019/0025818 A1    1/2019 Mattingly et al.
2020/0180625 A1*   6/2020 Takhirov ........... B60W 30/1819

* cited by examiner

400

500

600

CARAVANNING AUTONOMOUS VEHICLE TRAIN

CROSS-REFERENCE TO RELATED APPLICATIONS

The present application is a U.S. nationalization under 35 U.S.C. § 371 of International Application No. PCT/US2021/012346, filed Jan. 6, 2021, which claims the benefit of U.S. Provisional Patent Application Ser. No. 62/957,463, entitled "Caravanning Autonomous Vehicle Train," filed Jan. 6, 2020. The disclosures set forth in the referenced applications are incorporated herein by reference in their entireties.

FIELD

The present disclosure relates to autonomous vehicles, and more particularly, to caravanning autonomous vehicles for continuous wireless charging between caravanned vehicles.

BACKGROUND

Autonomous vehicles are vehicles equipped with sensors to identify and navigate through an environment with relatively little to no human input. Autonomous vehicle technology can be adapted to a variety of fields, such as in the trucking and logistics industry. Currently, the trucking industry faces a number of issues pertaining to safety and efficiency. More particularly, the American Transportation Research Institute (ATRI) determined that driver shortage, hours-of-service rules, and driver compensation are critical issues. For instance, the ATRI determined that truck drivers are ten times likelier to die on the job than workers in other industries due to fatigue and work-related illnesses. Further, such issues affect logistics by impacting transport cost efficiency and sustainability.

SUMMARY

Embodiments presented here disclose a system for ground autonomous agile transportation. Electrified autonomous vehicles may transform the existing transportation infrastructure into a more agile network. An autonomous delivery caravan system comprises a pilot vehicle and multiple freight and generator vehicles. The caravan system may also include an number of passenger vehicles at the tail end thereof. Any of the vehicles may disengage from the caravan and re-engage thereafter. In some embodiments, the disengaged trailer rejoins a different caravan piloted by a different pilot vehicle. In some embodiments, the pilot vehicle maintains stored charge on the trailing vehicles so there is a sufficient amount of power to be strategically deployed to a final destination. In some embodiments, the pilot vehicle is a hybrid electric vehicle comprising a generator capable of delivering power to multiple vehicles simultaneously. In some embodiments, the freight and other vehicles are fully electric autonomous vehicles that are non-mechanically connected and wirelessly charged. In some embodiments, the vehicles are fully autonomous, in which the vehicles can engage and disengage when strategically advantageous.

Embodiments also disclose a system for wirelessly charging an electric vehicle. In an embodiment, the system for wirelessly charging comprises a transmitting coil and a receiving coil. In some embodiments, the receiving coil is coupled to a second plate. In some embodiments, the transmitting coil is coupled to a first plate. In some embodiments, the first plate is coupled to a road, the ground, or a charging vehicle. In some embodiments, the transmitting coil is coupled to a pilot vehicle. In some embodiments, the transmitting coil is coupled to a dynamic first plate that allows the transmitting coil to move along an axis to better align with a receiving coil. In some embodiments, a receiving coil is static and the transmitting coil is static. In some embodiments, a receiving coil is static and the transmitting coil is dynamic. In some embodiments, the receiving coil is dynamic and the transmitting coil is static. In some embodiments, the transmitting coil is dynamic and transmitting coil is dynamic.

DESCRIPTION OF THE ILLUSTRATIVE EMBODIMENTS

Figure 1:
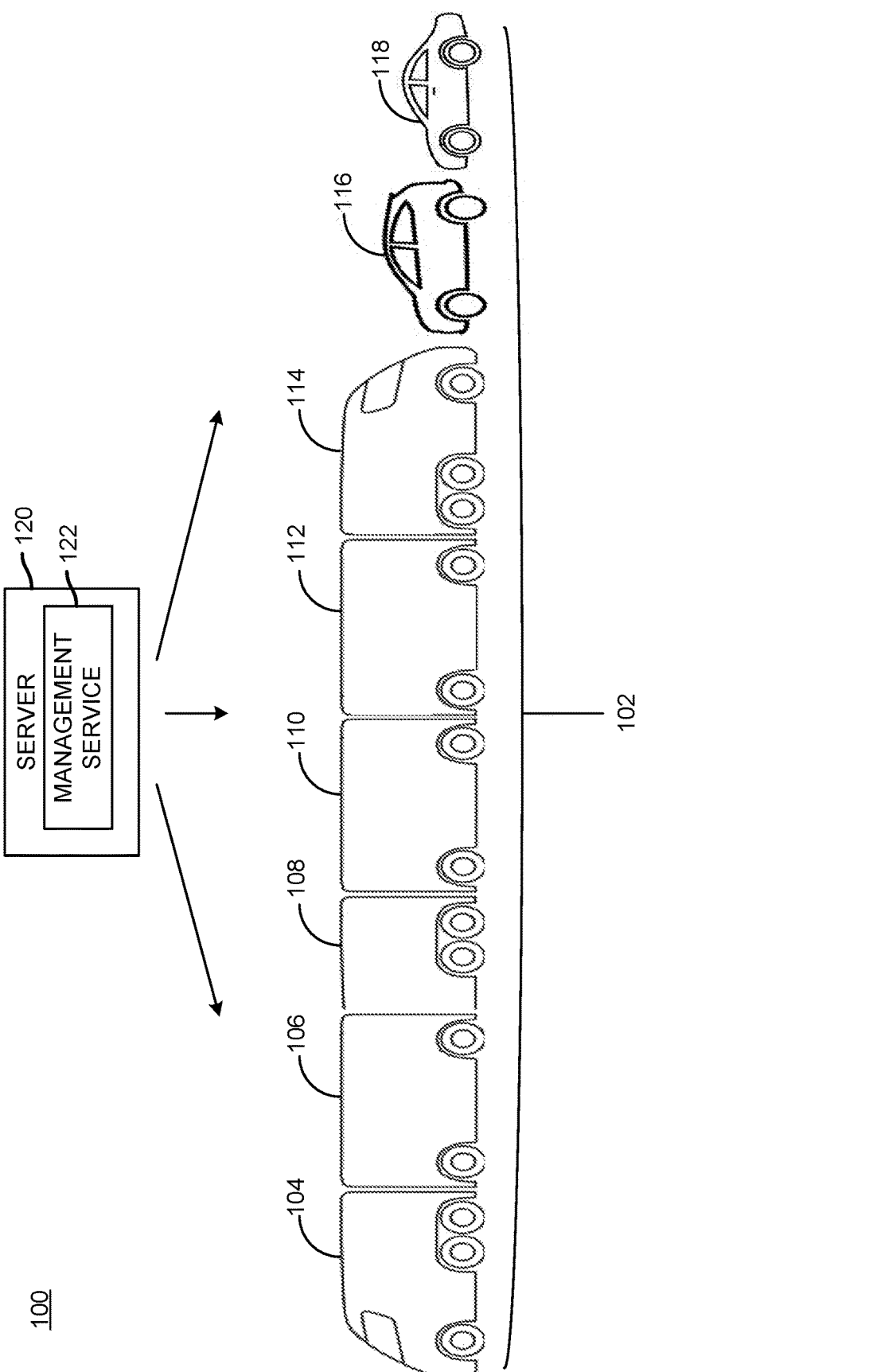
FIG. 1 illustrates an example an environment in which an autonomous vehicle caravan system (AVCS) operates, according to an embodiment.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Embodiments presented herein disclose techniques for providing an autonomous vehicle caravanning system (AVCS) allowing for continuous wireless charging between vehicles thereof. The AVCS includes one or more freight vehicles interconnected between one another with or without a mechanical connect. For instance, the vehicles may follow one another closely through advanced communication and control of vehicle speeds or by optionally using some buffer therebetween, such as magnetic repulsion techniques that activate when the spacing falls below a specified threshold distance. Further, the AVCS may also include one or more generator vehicles interspersed in various positions of the AVCS to provide wireless charging to vehicles therein.

Advantageously, the embodiments presented herein allow for freight vehicles to move within a given AVCS for long hauls while still being able to free roam in providing first- and last-mile services. Doing so enables an agile supply chain with autonomous (e.g., either fully or semi-autonomous) and electrified vehicles forming caravans with or without mechanical connect. Further, by situating generator vehicles within the AVCS to provide a wireless charge, the fright vehicles may be dynamically charged over a long range. Further still, the vehicles may be strategically deployed (e.g., by a logistics manager) for local pickup and delivery, with minimal local emissions impact on more dense populations. Even further, embodiments presented herein allow passenger vehicles to engage with the AVCS, e.g., allowing such vehicles to join safely at the rear of the caravan. Doing so allows the passenger vehicles to use the charging provided by the generator vehicles as well as allow autonomous passenger vehicles to participate in the route established for the caravan.

Referring now to FIG. 1, an environment 100 in which an AVCS may operate is now shown. As shown, the environment 100 includes a caravan 102 having logistics vehicles 104, 106, 108, 110, 112, and 114 and passenger vehicles 116 and 118. The environment 100 also includes a server 120, which provides a management service 122. The server 120 may be a physical computer or a virtual computing instance (e.g., executing in a cloud network). The server 120 may include a processor and a memory storing instructions, which, when executed on the processor, allows the server 120 to perform one or more of the features described herein.

The logistics vehicles 104, 106, 108, 110, 112, and 114 may correspond to trucks or trailers of a given fleet. Each of the logistics vehicles 104, 106, 108, 110, 112, and 114 may be semi- or fully-autonomous genset or electric freight cars. Further, each logistic vehicles 104, 106, 108, 110, 112, and 114 may serve a particular purpose. Particularly, logistics vehicle 104 is a pilot vehicle that goes from a starting destination to a final destination, and the vehicles 106, 108, 110, 112, and 114 are trailer vehicles that start on the same route of the pilot but can disengage from the caravan 102 for delivering goods or services and engage back once the pilot vehicle (e.g., logistics vehicle 104) is within a specified proximity thereof. The pilot vehicle (e.g., logistics vehicle 104) may be a parallel hybrid electric vehicle. Further, in this example, the logistics vehicle 114 is a tail vehicle. Each of the vehicles may include a variety of features, such as all-wheeled steering and all-wheel drive, interchangeable battery packs, and an electric motor drive.

Each of the vehicles 104, 106, 108, 110, 112, and 114 are linked via a non-mechanical connection. This may be done via a variety of methods. For example, the vehicles 104, 106, 108, 110, 112, and 114 may be configured to follow a preceding vehicle within a specified distance or distance range using control methods and communications using various protocols, such as vehicle-to-X (V2X) communications, Internet-of-Things (IoT) connections. Further, the vehicles 104, 106, 108, 110, 112, and 114 each use magnetic repulsion techniques, e.g., built into the bumpers of each vehicle, to prevent collision with other vehicles in the caravan. Bumpers between the vehicles include controlled and regenerative magnetic repulsion in addition to mechanical spring-and-damper systems to prevent hard collision and minimize impact damage. If the pilot vehicle (e.g., the vehicle 104) suddenly slows down or has an emergency stopping, the magnetic repulsion feature thereof activates to increase the deceleration of following vehicle (e.g., vehicle 106) to set up an automatic auxiliary braking system. While regenerative braking systems on each vehicle's wheels is a primary systemic control method to reduce speed, the goal of the bumper repulsion is to overcome system delays and augment the braking forces to maintain minimum separation (as well as improve efficiency of deceleration). The bumpers also incorporate wireless charging, when the spacing is optimal (but can switch off when the spacing is too far or close to activate magnetic repulsion). The design of wireless charging electromagnetic fields and bumper repulsion electromagnetic fields can be thus made non-interfering with an appropriate control system. Further still, each of the vehicles 104, 106, 108, 110, 112, and 114 include sensor arrays for detecting the surroundings of the vehicle, such as RADAR, LIDAR, camera sensors, and geolocation sensors. The vehicles may communicate their surroundings to other vehicles in the caravan 102 through a variety of protocols, such as V2X communications, IoT connections, and the like. In addition, each vehicle in the caravan 102 may communicate such data to the management service 122, which can propagate such data to the other vehicles in the caravan 102. The communications may also include driving control information, such as information for a given vehicle to steer, brake, and control speed.

Further, one or more of the logistics vehicles 104, 106, 108, 110, 112, and 114 may act as a generator vehicle to deliver power to other vehicles in the caravan 102, e.g., using near-field charging techniques. For instance, in this example, the logistics vehicles 104, 108, and 114 serve as generator vehicles, and logistics vehicles 106, 110, and 112 serve as freight vehicles. Each of the vehicles may or may not have an individual user occupying the vehicle. The generator cars may carry fuel and generate electricity to dynamically charge the freight vehicles over a long range, e.g., using near-field charging techniques. Although the generator vehicles may be situated in any part of the caravan 102, wireless charging of vehicles in the caravan 102 may be more effective if the generator vehicles are situated at both ends of the caravan 102 as well as in the middle of the caravan, as illustrated with vehicles 104, 108, and 114 serving as generator vehicles. Doing so limits the power transfer level of each vehicle, improves overall efficiency by limiting the number of wireless gaps that power crosses, and allows separation of freight vehicles at any time, even when a given vehicle is low in power. Power control by generator vehicles may optimize charging of each vehicle according to a need or demand of the vehicle, while also minimizing transmission loss. The pilot vehicle of the caravan 102 (e.g., the vehicle 104) has an on-board electric generator and power management unit (PMU) capable of delivering power to multiple vehicles in the caravan 102 simultaneously.

Illustratively, passenger vehicles (e.g., passenger vehicles 116 and 118) may also join the caravan 102 at the rear thereof. The passenger vehicles 116 and 118 may be semi- or fully-autonomous passenger vehicles or light trucks having compatible communication protocols (e.g., V2X, IoT, etc.) enabling the vehicles to communicate with the other vehicles of the caravan 102. The passenger vehicles can benefit from lower fuel consumption through aerodynamic drafting. Further, the caravan 102 may provide wireless charging to the passenger vehicles when engaged. Such charging can be provided through a subscription model, such that if a given passenger vehicle has charging privileges associated therewith, the passenger vehicle can receive charging from the generator vehicles in the caravan 102. The passenger vehicles may also receive communications from other vehicles in the caravan 102 (or from the management service 122) for route and trajectory information for use in allowing the caravan 102 to assume driving functions for the passenger vehicles.

The management service 122 may be embodied as a control center remotely situated from the caravan 102. The management service 122 may direct and monitor logistics pertaining to the caravan 102, such as navigation and route trajectory information, vehicle data, payload information, and so on. Vehicles in the caravan 102 may transmit data to and receive data from the management service 122 while in operation.

Figures 2A, 2B:
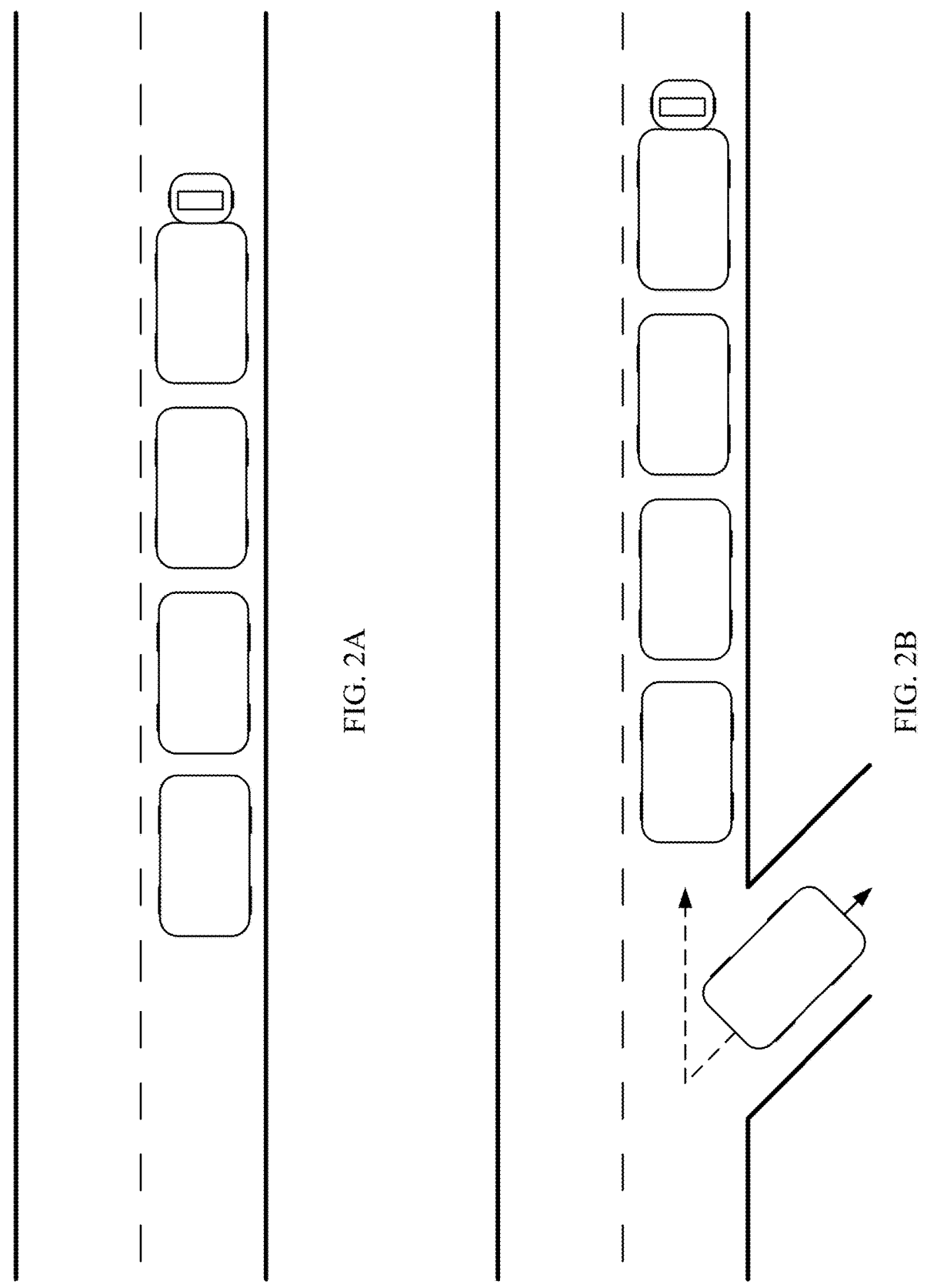
FIG. 2A illustrates an example AVCS on route, according to an embodiment.
FIG. 2B illustrates an example AVCS vehicle disengaging therefrom, according to an embodiment.
Figure 2C:
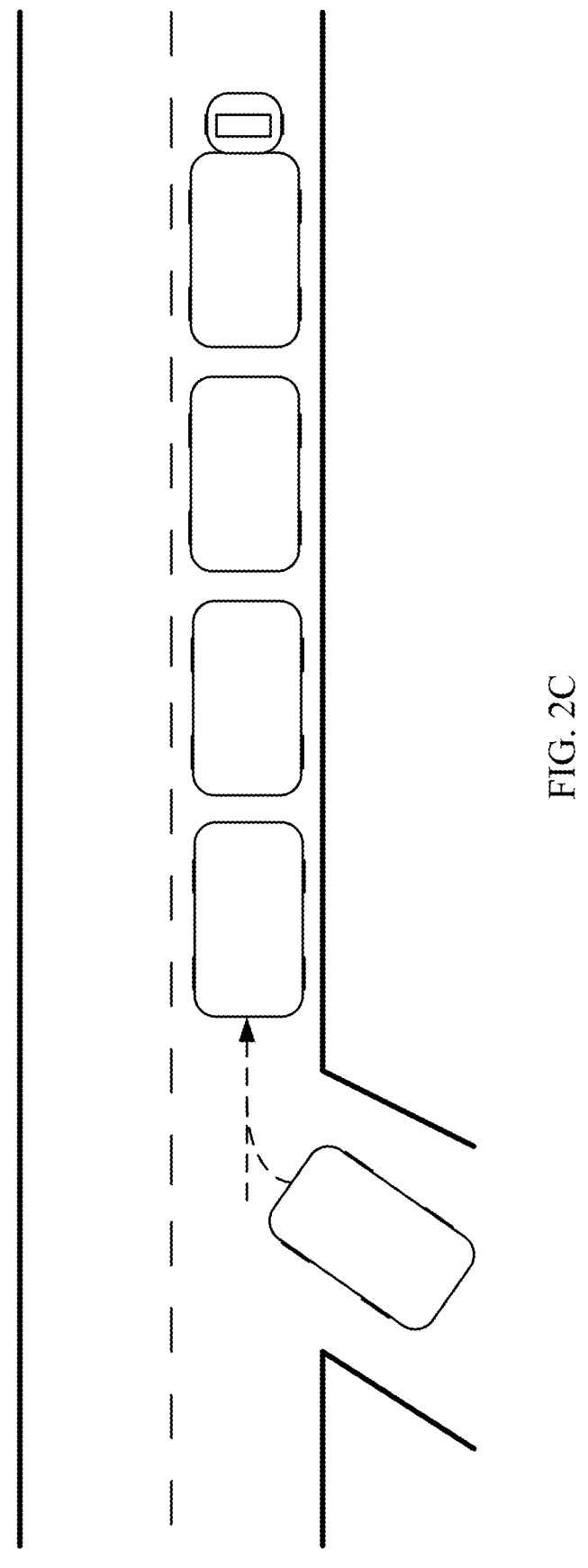
FIG. 2C illustrates an example AVCS vehicle engaging thereto, according to an embodiment.

FIG. 2A show an example caravan in route, while FIGS. 2B and 2C portray a freight vehicle disengaging and engaging from the caravan respectively. As stated, caravan vehicles can start at a given point in a route relative to the pilot vehicle (e.g., at a hub or en-route) but can disengage at different points. For example, the scenario depicted in FIG. 2B may occur when a vehicle disengages from the caravan to deliver goods or services to a particular location diverging from the caravan route. The scenario in FIG. 2C may occur when a freight vehicle has completed a delivery and rejoins the caravan.

Figure 3A:
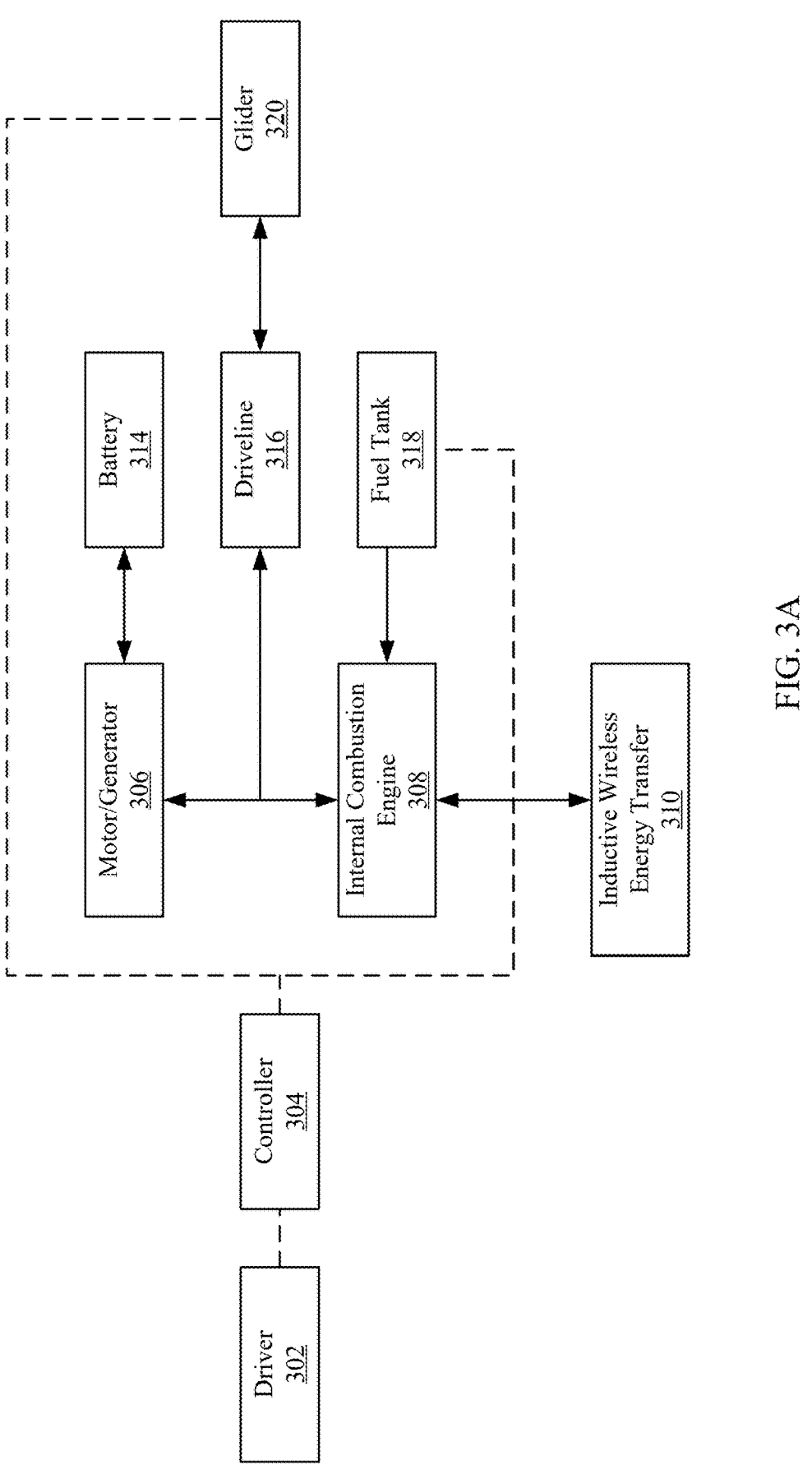
FIG. 3A illustrates a block diagram of a generator vehicle of an AVCS.
Figure 3B:
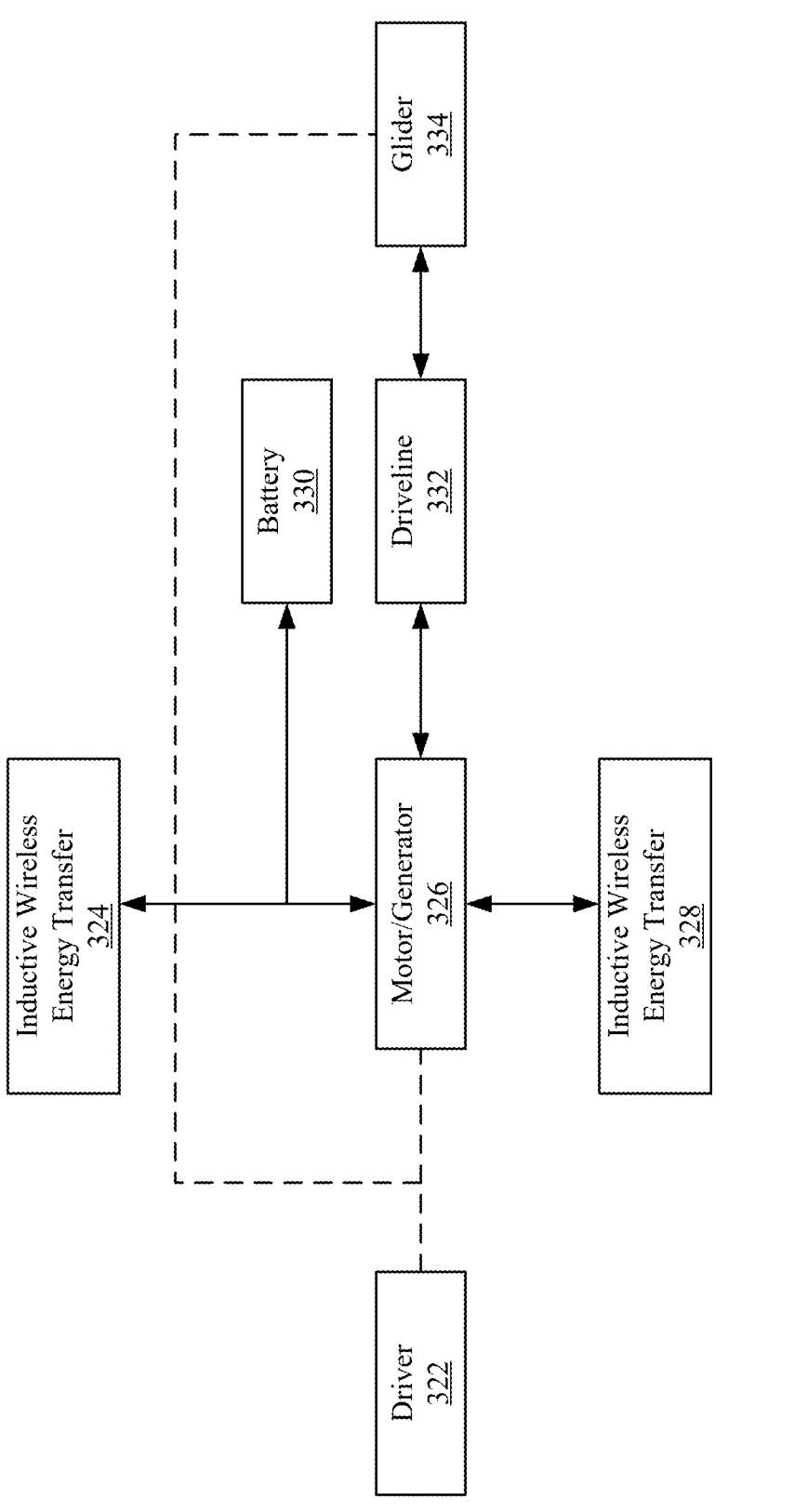
FIG. 3B illustrates a block diagram of a freight vehicle of an AVCS.

FIGS. 3A and 3B are block diagrams of a generator vehicle (e.g., vehicle 104) and a freight vehicle, respectively. In each block diagram, a dashed line indicates that signals are transmitted between the underlying block units and a solid one-way or two-way arrow line indicates that power is transmitted in the direction of the arrow from a source block unit to a target block unit. As shown, the generator vehicle includes a driver unit 302, controller unit 304, motor/generator unit 306, an internal combustion engine unit 308, an inductive wireless energy transfer unit 310, a battery unit 314, a driveline unit 316, a fuel tank unit 318, and a glider unit 320.

The glider unit 320 may be representative of a physics-based model in which tractive force overcomes all other forces acting on the generator vehicle. In an embodiment, the input to the glider unit 320 can be obtained from the driveline unit 316. The driveline unit 316 may comprise the motor/generator unit 306 and the internal combustion engine unit 308 and combine power from each of the units 306 and 308 needed for propulsion. The power used by the motor/generator unit 306 and the internal combustion engine unit 308 is specified by the controller unit 304. The controller unit 304 may include a processor and a memory storing instructions, which, when executed, causes the controller unit 304 to carry out the various embodiments disclosed herein. For instance, the controller unit 304 defines output based on output from the driver unit 302 and other variables in the system. In an embodiment, the controller ensures that the battery unit 314 maintains a state of charge (SOC) that does not fall below a specified threshold, such as 45%. In an embodiment, the controller unit 304 further ensures that the other vehicles in the caravan maintain a SOC within a specified range of destination charge prior to disengaging, such as between 90-95%, and between another specified range after re-engaging with the caravan after delivery, such as between 30-40%.

In an embodiment, the driver unit 302 itself may include a controller that compares drive cycle data (e.g., a reference vehicle speed) and actual vehicle speed. The controller may define an accelerator pedal position and a brake pedal position.

As shown, the freight vehicle includes a driver unit 322, an inductive wireless energy transfer unit 324, a motor/generator unit 326, an inductive wireless energy transfer unit 328, a battery unit 330, a driveline unit 332, and a glider unit 334. These components may operate in a similar fashion as the generator vehicle.

In an embodiment, an in-route electric vehicle (EV) charging system allows an EV to be charged while moving in a highway type of drive cycle (also referred to herein as a vehicle-to-vehicle recharging (VVR) system in which the process of transferring electric power from one vehicle to another is implemented wirelessly). The VVR system allows EVs to drive further distances without stopping to recharge batteries.

In an embodiment, the generator vehicles and freight vehicles of the caravan may include a coil structure used for power transfer. Wireless power transfer can occur with high efficiency if plates of the transmitting and receiving coils are aligned. Wireless power transfer for EVs can occur when electric current is transferred by creating a magnetic field between a transmitting pad on the ground and a receiving pad located under the vehicle. In such a case, alignment between plates is not easily accomplished. In an embodiment, to address this issue, a model may be used in which k is a coupling coefficient between a first coil and a second coil; V is a phasor of the voltage source in the first coil, $L_1$ and $L_2$ are self-inductances of the two coils, and $R_1$ and $R_2$ are parasitic resistances of the two coils. Also, $C_1$ and $C_2$ are capacitances of the respective coils, where $\omega_0$ is the resonant frequency of the system. $R_S$ is the source resistance, and $R_L$ is the load resistance. The coupling k is also a function of the angle $\theta$. Efficiency can be expressed as:

$$\eta = \frac{k^2 \omega^2 L_1 L_2 R_L}{R_1 (R_2 + R_L)^2 + k^2 \omega^2 L_1 L_2 (R_1 + R_2)}, \quad (1)$$

where k is the coupling coefficient.

In an embodiment, the receiving coil is comprised of a metal. In an embodiment, the receiving coil is coupled to a second plate. In an embodiment, the second plate is coupled to a vehicle. In an embodiment, the vehicle is a hybrid vehicle. In an embodiment, the vehicle is an EV. In an embodiment, the second plate comprises a durable material. In an embodiment, the durable material is a metal. In an embodiment, the second plate comprises a magnet configured to attach another magnet.

In an embodiment, the transmitting coil is comprised of a metal. In an embodiment, the transmitting coil is coupled to a first plate. In an embodiment, the first plate is coupled to asphalt or concrete over which a vehicle may drive. In an embodiment, the asphalt or concrete is coupled to a road, a parking garage, a parking lot, a driveway, an avenue, a boulevard, a parking lot, a highway, or an interstate. In an embodiments, the first plate comprises a durable material. In an embodiment, the durable material is a metal. In an embodiment, the first plate comprises a magnet configured to attract another magnet.

In an embodiment, a system is disclosed in which a dynamic or static first plate comprising a transmitting coil and a magnet is configured to attract a dynamic or static second plate comprising a receiving coil and a magnet. In some embodiments, the second plate is static while the first plate is dynamic In an embodiment, the second plate is dynamic while the first plate is static. In an embodiment, the first plate is dynamic and the second plate is static.

Figure 4:
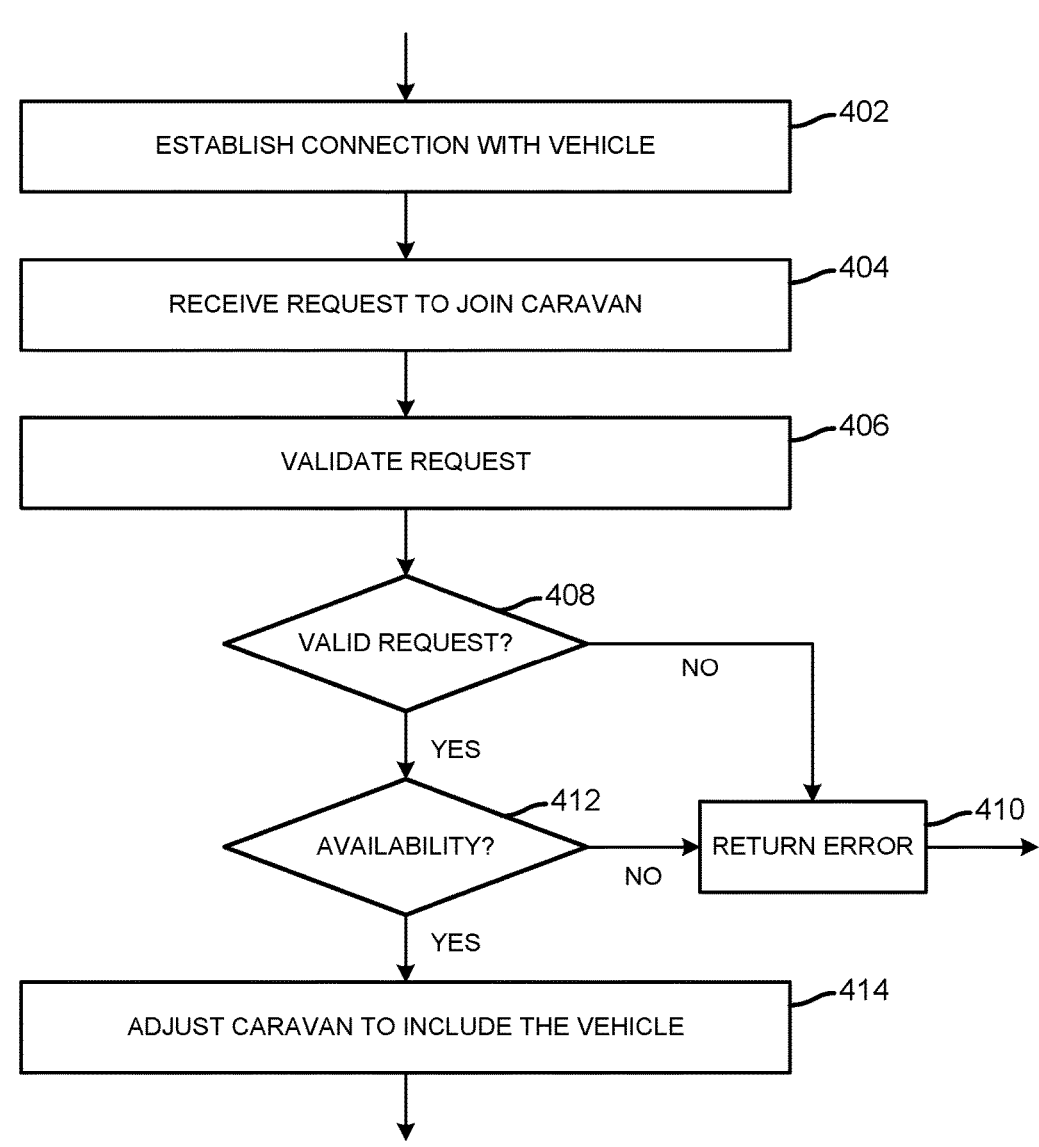
FIG. 4 illustrates a flow diagram of an example method for incorporating a vehicle into an AVCS.

FIG. 4 illustrates a method 400 for incorporating a vehicle into an AVCS caravan, according to an embodiment. The method 400 may carried out, e.g., by a pilot vehicle of a caravan or a remote management service, in the event that a vehicle that is not currently part of the caravan requests to engage with the caravan. As shown, the method 400 begins in block 402, in which the caravan (e.g., the pilot vehicle or the management service) establishes a connection with the vehicle. For example, the vehicle may initiate connection establishment using a variety of protocols, such as V2X, IoT, and other types of wireless communication.

In block 404, the caravan receives, over the established connection, a request to join. The request may include a variety of data, such as user credentials, identifying information associated with the vehicle (vehicle identification number, serial number of on-board communications equipment, a network address, etc.), logistics credentials (e.g., shipment information, vendor information, etc.), and so on. In block 406, the caravan validates the request. For example, the pilot vehicle may obtain the data included in the request and send the data to the management service. In turn, the management service may validate the credentials against a database (e.g., a subscriber database, vendor database, etc.). In block 408, the caravan determines whether the request is valid. For instance, the caravan may determine whether the requesting vehicle is authorized to engage with the caravan based on the received request information. For example, the vehicle can be authorized if the vehicle is in an approved list of freight vehicles for that particular caravan. The vehicle can also be authorized if the vehicle is identified as a passenger vehicle that is subscribed to a wireless charging service provided by the caravan. If the request is not valid, the method 400 proceeds to block 410, in which the caravan (e.g., the pilot vehicle or the management service) returns an error to the requesting vehicle.

If the request corresponds to a valid request, then, in block 412, the caravan determines whether the caravan has availability to allow the vehicle to engage with the caravan. For instance, the caravan may have a set amount of resources to provide to other vehicles within the caravan, such as charging availability. The caravan may also be capped at a specified amount of vehicles. If the caravan lacks availability to allow the vehicle to engage, then in block 410, the caravan returns an error to the requesting vehicle. Otherwise, in block 414, the caravan modifies a configuration of the caravan to allow the vehicle to engage.

Figure 5:
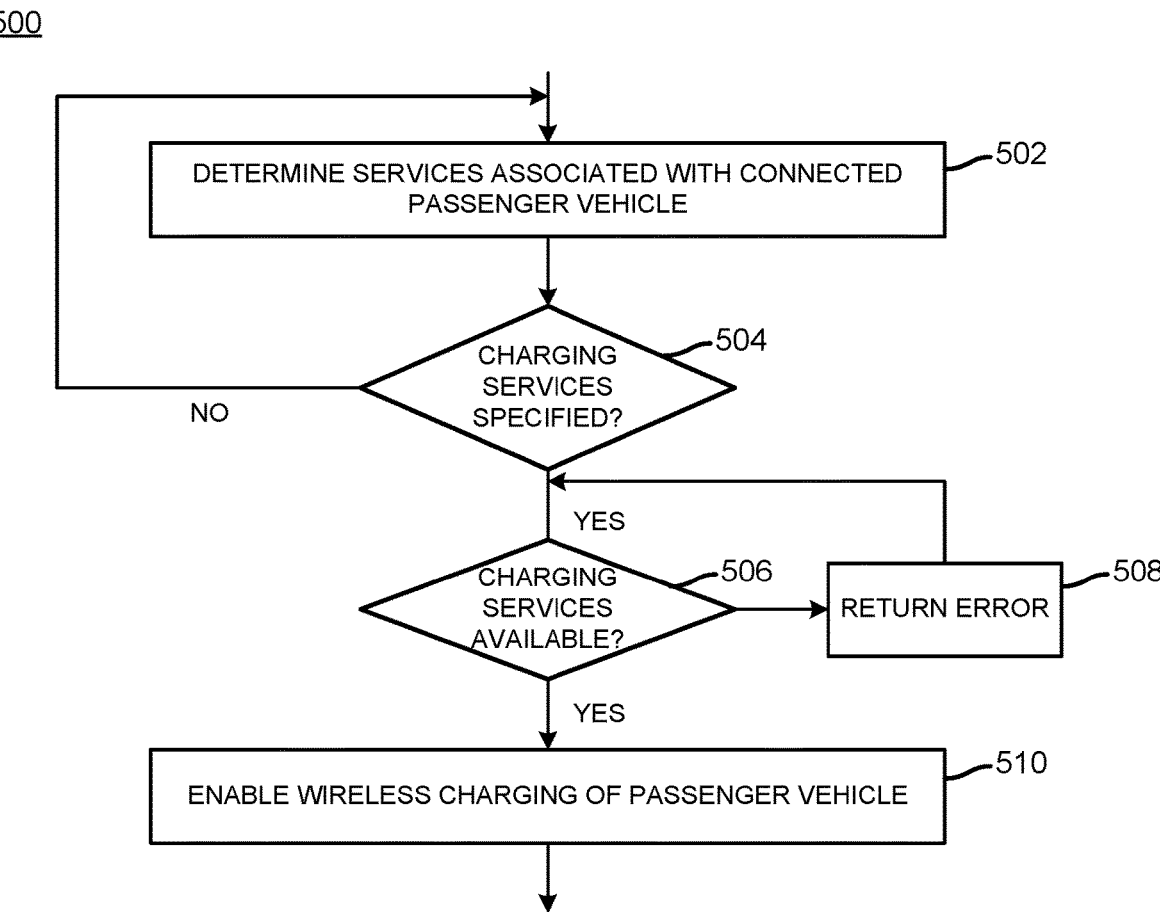
FIG. 5 illustrates a flow diagram of an example method for providing subscriber services to a passenger vehicle engaged with an AVCS.

FIG. 5 illustrates a method 500 for providing caravan wireless charging services to a passenger vehicle. As stated, the caravan may allow for a subscriber model to allow passenger vehicles to use various services provided by the caravan, such as wireless charging and automated driving. In this example, assume that a passenger vehicle has already engaged with a given caravan. As shown, the method 500 begins in block 502, in which the caravan (e.g., the pilot vehicle or the management service) determines services associated with the connected passenger vehicle. For example, information regarding the passenger vehicle (or user of the passenger vehicle) may be stored in a remote database. The information may specify services that the user or passenger may be subscribed to, including wireless charging services. The information may also specify a type of charging (e.g., a length of time to allow the passenger to charge the vehicle, a charging speed, etc.). In block 504, the caravan determines whether charging services are specified based on the information. If not, then the caravan may return to the top of method 500. Particularly, the method 500 may loop back to block 502 such that the caravan may determine whether the passenger vehicle has subsequently subscribed for wireless charging services. If the passenger vehicle subscribes to charging services, then in block 506, the caravan may determine whether charging services are available to the passenger vehicle. For instance, to do so, the caravan may evaluate a current state of charging to other vehicles in the caravan. Certain circumstances may restrict the caravan from providing wireless charge to the passenger vehicle, such as if the caravan's charging resources are at maximum capacity delivering a required charge to freight vehicles in the caravan. If charging services are not presently available to the passenger vehicle, then in block 508, the caravan may return an error to the vehicle and loop back to block 506 until charging services are available to the passenger vehicle. Otherwise, in block 510, the caravan enables wireless charging of the passenger vehicle. For instance, the pilot vehicle may send a communication to the tail end generator vehicle in the caravan to cause the generator vehicle to wirelessly charge the passenger vehicle.

Figure 6:
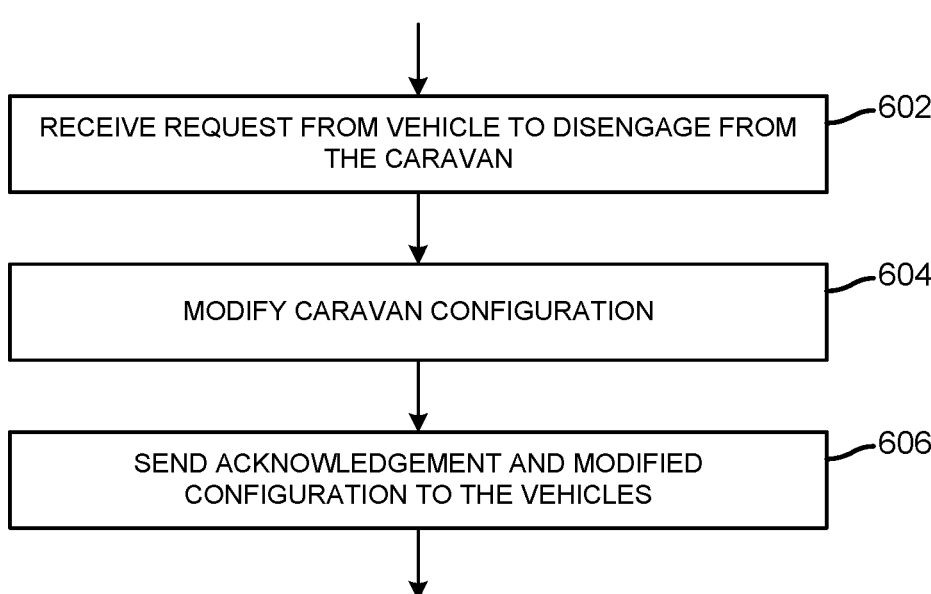
FIG. 6 illustrates a flow diagram of an example method for disengaging a vehicle from an AVCS.

Referring now to FIG. 6, a method 600 for disengaging a vehicle from the caravan is shown. As shown, the method 600 begins in block 602, in which the caravan receives a request from a vehicle (e.g., a freight vehicle or a passenger vehicle) to disengage from the caravan. In block 604, the caravan modifies the caravan configuration to remove the vehicle from the caravan. In block 606, the caravan sends an acknowledgement to the disengaging vehicle. The caravan may also propagate the new configuration to other vehicles in the caravan, allowing the other vehicles to adjust positioning, speed, and so on, accordingly.

The invention claimed is:

1. A system, comprising:
a pilot vehicle comprising a controller unit and a battery;
one or more freight vehicles in communication with at least the pilot vehicle, and
wherein the pilot vehicle and one or more freight vehicles are arranged in a caravan configuration,
wherein the pilot vehicle provides wireless electric charging to the one or more freight vehicles in the caravan configuration, and
wherein the controller unit is configured to:
maintain a state of charge (SOC) of the battery above a specified threshold,
regulate the wireless electric charge to the one or more freight vehicles such that prior to disengagement from the caravan configuration, a first one of the freight vehicles is charged to a SOC within a first SOC range, and upon reengagement, the first one of the freight vehicles is charged to a SOC within a second SOC range different from the first SOC range,
establish a connection with a second vehicle unassociated with the caravan configuration,
receive a request from the second vehicle to join the caravan configuration, the request comprising one or more credentials associated with the second vehicle,
determine whether the request is valid based on a transmission of the request to a management service validating the one or more credentials, and
upon a determination that the request is valid, modify the caravan configuration to include the second vehicle.

2. The system of claim 1, further comprising one or more generator vehicles interspersed within the caravan configuration.

3. The system of claim 2, wherein the caravan configuration separates the pilot vehicle, freight vehicles, and generator vehicles within a specified distance from a preceding vehicle.

4. The system of claim 3, wherein each of the pilot vehicle, freight vehicles, and generator vehicles use magnetic repulsion to maintain distance in the caravan configuration.

5. The system of claim 4, wherein the magnetic repulsion regenerates electrical power and recharges a battery in each of the pilot vehicle, freight vehicles, and generator vehicles.

6. The system of claim 2, further comprising one or more passenger vehicles, the one or more passenger vehicles in communication with at least the pilot vehicle.

7. The system of claim 6, wherein the one or more passenger vehicles are further in communication with at least one of the one or more generator vehicles.

8. The system of claim 7, wherein the at least one or more generator vehicles provides electric charging to the one or more passenger vehicles.

9. The system of claim 1, further comprising, a server comprising a management service to manage logistics of the system.

10. The system of claim 1, wherein the controller unit is further configured to:

determine whether the caravan configuration has availability to allow the second vehicle to join the caravan configuration.

11. The system of claim 1, wherein the controller unit is further configured to:

determine one or more services available to the second vehicle;

upon a determination that charging services are available second vehicle, provide wireless charging to the second vehicle.

12. The system of claim 1, wherein the controller unit is further configured to:

receive a request from one of the one or more freight vehicles to disengage from the caravan configuration;

modify the caravan configuration to remove the one of the one or more freight vehicles therefrom.

13. The system of claim 12, wherein the controller unit is further configured to:

receive a second request from the one of the one or more freight vehicles to reengage with the caravan configuration; and modify the caravan configuration to readd the one of the one or more freight vehicles thereto.

14. A method comprising:

maintaining, by a controller unit of a pilot vehicle in a caravan configuration with one or more generator vehicles and one or more freight vehicles, a state of charge of a battery of the pilot vehicle above a specified threshold;

regulating, by the control unit, a wireless electric charge to the one or more freight vehicles such that prior to disengagement from the caravan configuration, a first one of the freight vehicles is charged to a SOC within a first SOC range, and upon reengagement, the first one of the freight vehicles is charged to a SOC within a second SOC range different from the first SOC range;

establishing, by the controller unit , a connection with a second vehicle unassociated with the caravan configuration;

receiving, by the controller unit, a request from the second vehicle to join the caravan configuration, the request including one or more credentials associated with the second vehicle;

determining, by the controller unit, whether the request is valid based on a transmission of the request to a management service validating the one or more credentials, and upon determining that the request is valid, modifying, by the controller unit, the caravan configuration to include the second vehicle.

15. The method of claim 14, further comprising:

determining, by the controller unit, whether the caravan configuration has availability to allow the second vehicle to join the caravan configuration.

16. The method of claim 14, further comprising:

determining, by the controller unit, one or more services available to the second vehicle;

upon determining that charging services are available second vehicle, causing, by the controller unit, at least one of the one or more generator vehicles to provide wireless charging to the second vehicle.

17. The method of claim 14, further comprising:

receiving, by the controller unit, a request from one of the one or more generator vehicles or the one or more freight vehicles to disengage from the caravan configuration; and modifying, by the controller unit, the caravan configuration to remove the one of the one or more generator vehicles or the one or more freight vehicles.

18. The method of claim 17, further comprising:

receiving, by the controller unit, a second request from the one of the one or more generator vehicles or the one or more freight vehicles to reengage with the caravan configuration; and modifying, by the controller unit, the caravan configuration to include the one of the one or more generator vehicles or the one or more freight vehicles thereto.

* * * * *